April 23, 1935. C. B. COLE ET AL 1,998,893
BORING AND FACING TOOL HEAD
Filed Sept. 28, 1932 2 Sheets-Sheet 1
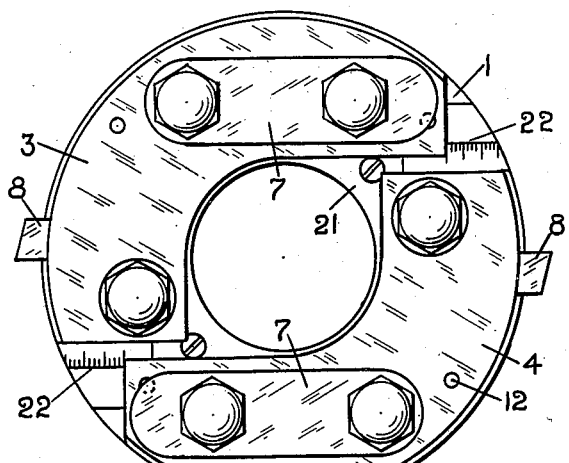
Fig.1
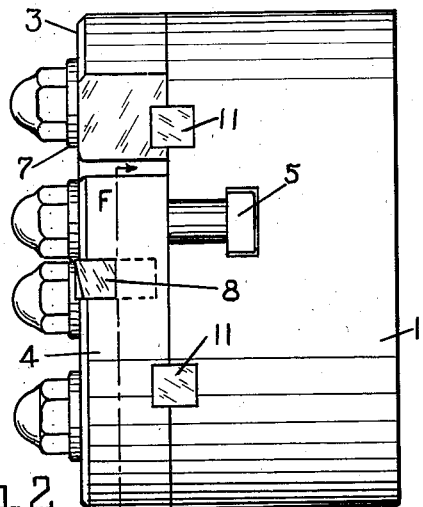
Fig.2
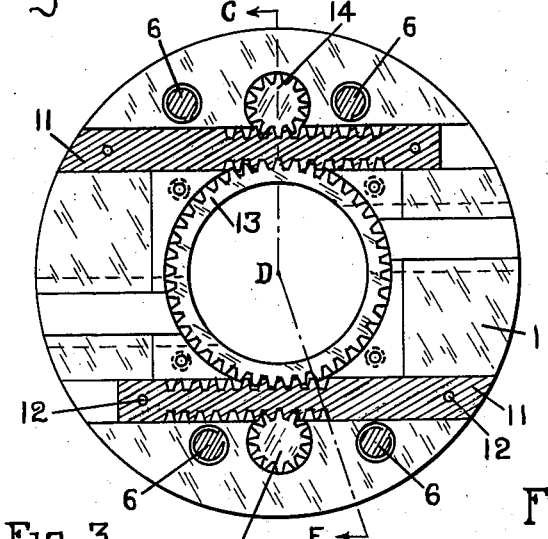
Fig.3
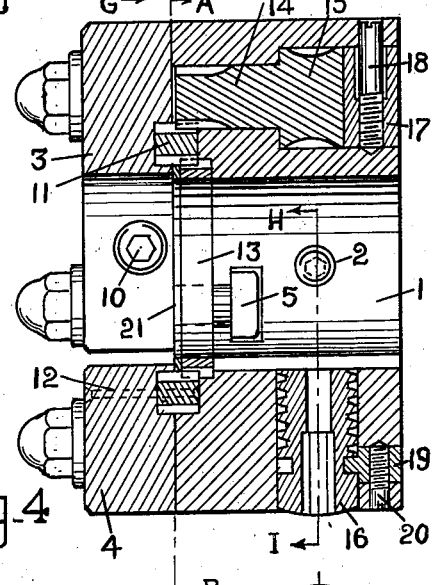
Fig.4
Fig.6
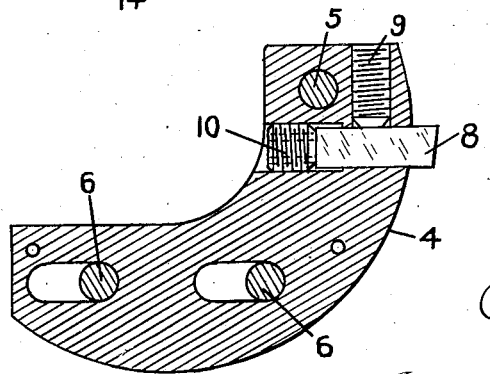
Fig 5
INVENTORS
Charles Bradford Cole
Otto Leroy Lewis
Jones, Addington, Ames & Seibold
ATTYS April 23, 1935.   C. B. COLE ET AL   1,998,893
BORING AND FACING TOOL HEAD
Filed Sept. 28, 1932   2 Sheets-Sheet 2
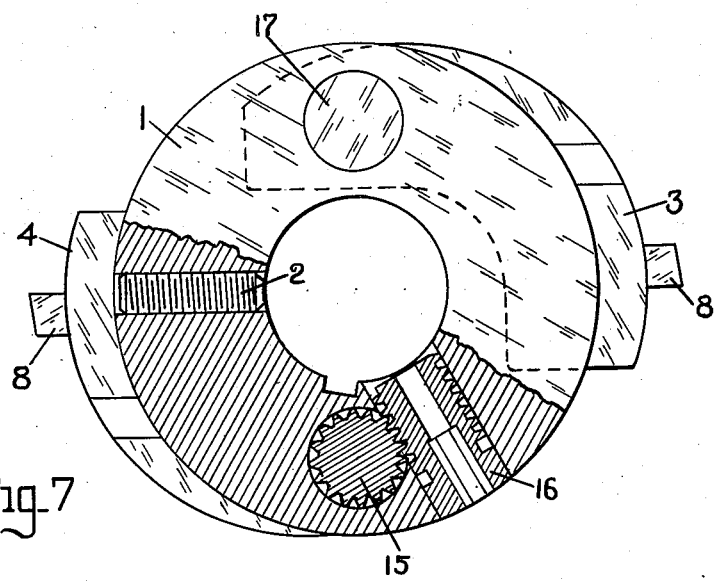
Fig. 7
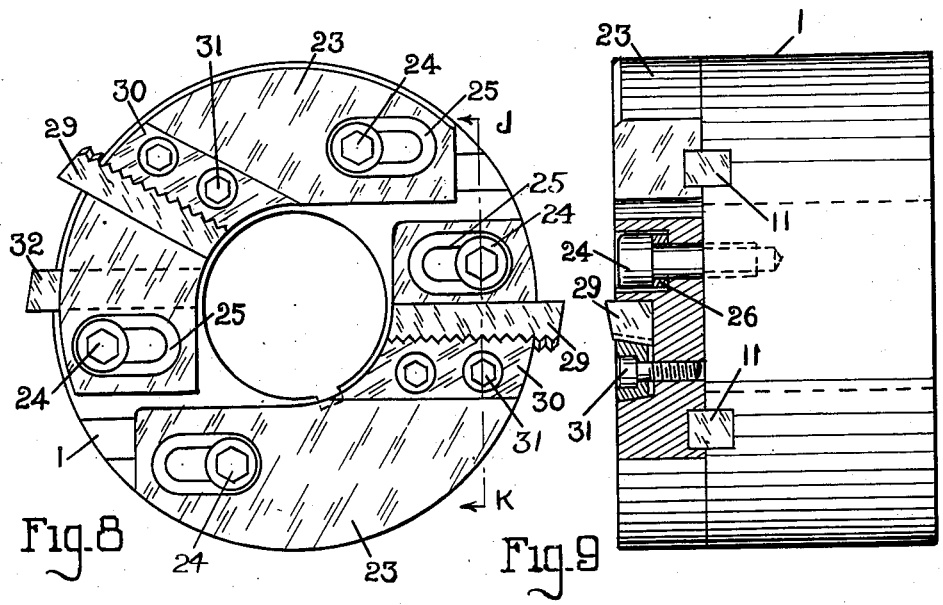
Fig. 8   Fig. 9
Fig. 10
INVENTORS
Charles Bradford Cole
Otto Leroy Lewis
Jones, Addington, Ames, & Seibold
ATTYS Patented Apr. 23, 1935

1,998,893

UNITED STATES PATENT OFFICE 1,998,893

BORING AND FACING TOOL HEAD

Charles B. Cole, Berwyn, and Otto L. Lewis, Chicago, Ill.

Application September 28, 1932, Serial No. 635,212

3 Claims. (Cl. 77—58)

Our present invention relates to boring and facing tool heads in general such as are commonly used on a boring bar, the bar being a part of or separate from the machine driving the bar, and the tool head integral with or separate from the bar. It particularly relates to that type of tool carrying head in which the tool is secured in a laterally movable slide for obtaining adjustment. The tool itself may be a cutting tool, a grinder, a burnisher or any other device used to machine a surface.

The object of this invention is to provide such a boring and facing head having an exceptionally rigid construction and an accurate adjustment over a wide range of diameters. This object we attain by means of the mechanism illustrated in the accompanying drawings, showing a preferred and an alternate construction, the drawings forming a part of this specification. We realize, however, that a wide variety of changes in detail and combination could be made without departing from the spirit of this invention, and therefore, we do not limit ourselves to the constructions shown.

Referring to the drawings:

Figure 1 is a front view of the assembled head;

Fig. 2 is a side view thereof;

Fig. 3 is a view of the head with the tool holders and gear guard removed, the racks being sectioned on plane A, B, of Fig. 4;

Fig. 4 is a sectional view of the assembled head taken on planes C, D, E of Fig. 3;

Fig. 5 is a sectional view of the tool holder taken on plane F, G, of Fig. 2;

Fig. 6 is an end view of the adjusting worm;

Fig. 7 is a partly sectioned rear view of the assembled head with the tool holders in extended position, the section being taken on plane H, I of Fig. 4;

Fig. 8 is a front view of an alternate construction of the assembled head;

Fig. 9 is a side view thereof, the tool holder being sectioned on plane J, K of Fig. 8; and Fig. 10 shows an alternate construction for the tool holder clamping bolts.

Referring now to Figs. 1 to 7, inclusive, the construction shown comprises a body 1 bored and keywayed for mounting on a boring bar and retained on the bar by set screw 2. Tool holders 3 and 4, which are similar, may be firmly clamped against the face of body 1 by T-bolts 5 and studs 6. The nuts on the T-bolts and studs are slightly loosened while the tool holders are being adjusted and tightened before operating. Studs 6 pass through slots in tool holders 3 and 4, the slots permitting lateral adjustment of the tool holders. The heads of the T-bolts 5 may be moved laterally in the T-slots in the body 1. Dust is excluded from the slots in the tool holders by elongated washers 7. Cutting tools 8 are secured in the holders by set screws 9 and backed up by hollow head set screws 10, the wrench hold extending entirely through set screws 10 so that the wrench may be inserted from the outside when cutting tool 8 is removed.

Tool holders 3 and 4 are guided in their lateral movement by the racks 11, which are riveted to the tool holders by rivets 12. The racks have a sliding fit in corresponding keyseats in body 1.

Racks 11 have gear teeth on two edges, the teeth on the inner edge engaging the gear 13 and the teeth on the outer edge engaging adjusting pinions 14. The pinions 14 are integral with the worm gears 15 meshing with worms 16, the ends of the worms 16 being graduated as shown in Fig. 6. Worm gears 15 are retained in one direction by a shoulder in the body 1 and in the other direction by plugs 17 secured in the body 1 by screws 18. The worms 16 are retained endwise by keys 19 which fit a groove in the worm and are secured in the body 1 by screws 20.

The gear 13 is protected by a dust guard 21.

The amount of lateral travel of the tool holders is indicated by graduation 22 on the face of the body.

The tool holders 4 may be moved laterally in either direction by turning the worms 16 by means of a socket wrench, the motion being transmitted from the worms to the tool holders through worm gears 15, pinions 14 and racks 11. The tool holders will be independently adjustable if the gear 13 is removed. If it is desired to adjust both tool holders equally and simultaneously, one pinion 14 must be removed unless the helix angle on the worm is great enough to avoid locking.

Referring to Figs. 8, 9 and 10, the body, racks, gears and pinions are substantially the same as in the construction previously described, except the construction of the tool holder itself is different.

The tool holders 23 are clamped against the face of the body 1 by hollow head cap screws 24 which pass through counterbored slots 25 in the tool holders 23, the washers 26 being interposed between the under surface of the cap screw head and the bottom of the slot to avoid wear. As a substitute for the hollow head cap screws 24, nuts 27 and studs 28 may be used (as shown in Fig.

10), and the nut 27 may be replaced by a nut of hexagonal or other formation.

The cutting tools 29 have their back edges beveled and serrated, the bevels and serrations matching similar bevels and serrations on wedge-shaped retaining blocks 30, which firmly hold cutting tools 29 in the tool holders 23 when the hollow head cap screws 31 are tightened. The cutting tools 29 may be arranged so as to be 180° apart, or in an angular position as shown and they may be used independently or with other tools 32, similar to tools 8, supported in the tool holders 23. The construction shown by Figs. 8, 9 and 10 is particularly desirable for facing operations and boring bottoming holes.

A preferred construction of this boring and facing head would include hardened wear surfaces on all exposed and rubbing parts, thereby improving the appearance, eliminating wear, increasing accuracy, avoiding trouble from dust and chips and increasing durability.

Further modifications will be apparent to those skilled in the art and it is desired, therefore that the invention be limited only by the prior art and the scope of the appended claims.

Having thus described our invention, what we claim and desire to secure by Letters Patent is:

1. A boring and facing head for use with a boring bar comprising a tool holder carrier having an opening therethrough, through which a boring bar may extend, a plurality of tool holders slidably mounted on the face of said carrier on opposite sides of the boring bar, racks secured to said slidable tool holders, respectively, said carrier having guideways in its face for said racks, and means for simultaneously adjusting said holders comprising a gear centrally mounted on said carrier and meshing with said racks and having an opening through which the boring bar may extend.

2. A boring and facing head for use with a boring bar comprising a tool holder carrier having an opening therethrough, through which a boring bar may extend, a plurality of tool holders slidably mounted on the face of said carrier on opposite sides of the boring bar, racks secured to said slidable tool holders, respectively, said carrier having guideways in its face for said racks, means for simultaneously adjusting said holders comprising a gear centrally mounted on said carrier and meshing with said racks and having an opening through which the boring bar may extend, and means for actuating said gear comprising a pinion having its axis extending longitudinally of the boring bar for driving said rack.

3. A boring and facing head for use with a boring bar comprising a tool holder carrier having an opening therethrough, through which a boring bar may extend, a plurality of tool holders slidably mounted on the face of said carrier on opposite sides of the boring bar, racks secured to said slidable tool holders, respectively, said carrier having guideways in its face for said racks, means for simultaneously adjusting said holders comprising a gear centrally mounted on said carrier and meshing with said racks and having an opening through which the boring bar may extend, means for actuating said gear comprising a pinion having its axis extending longitudinally of the boring bar for driving said rack, a worm gear rotatable with said pinion, and a worm for driving the worm gear extending radially with respect to the carrier and accessible for operation from the periphery of the carrier.

CHARLES B. COLE.
OTTO L. LEWIS.